May 23, 1961  S. H. MAGID  2,985,221
APPARATUS FOR FORMING AND HEAT SEALING TUBULAR EDGINGS
TO THERMOPLASTIC SHEET MATERIAL
Filed June 24, 1957  2 Sheets-Sheet 2

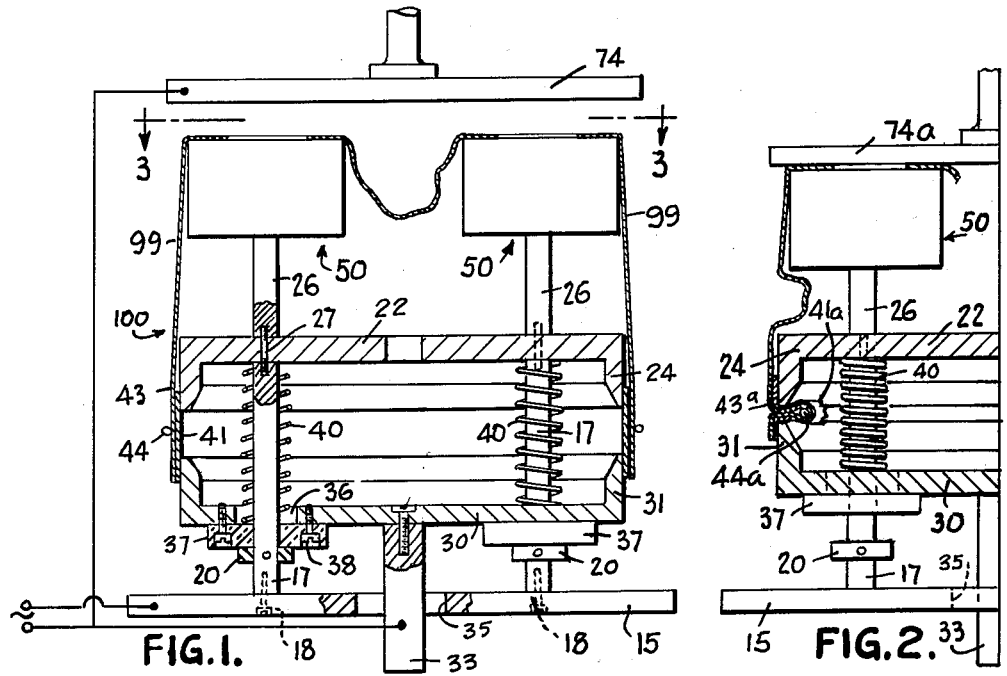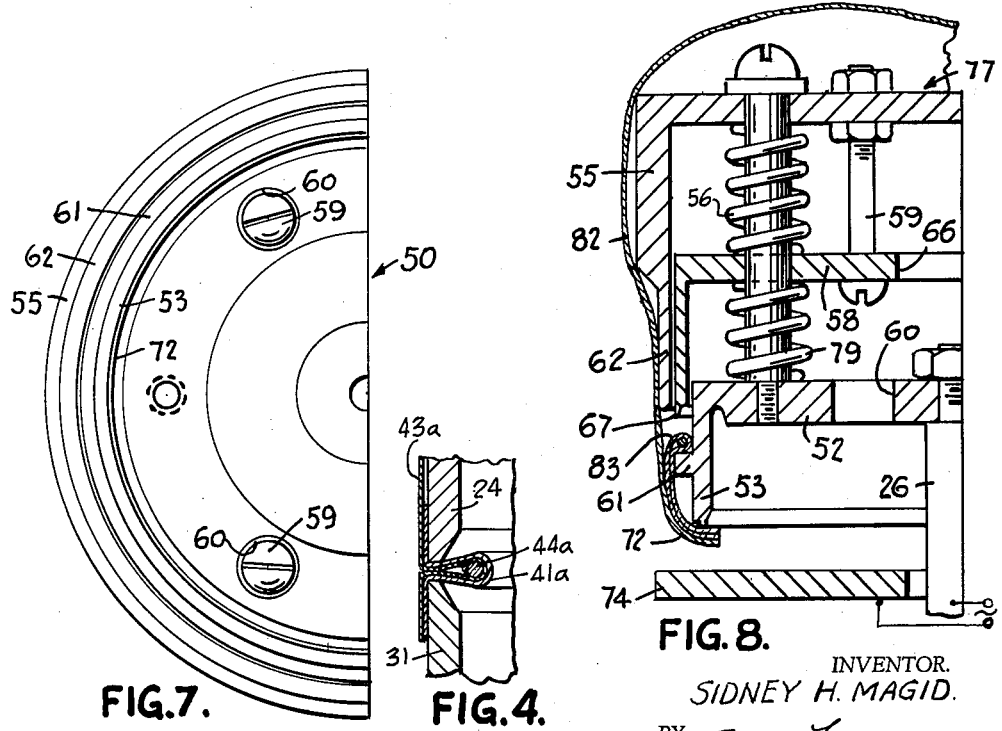

INVENTOR.
SIDNEY H. MAGID.
BY
Percy Freeman
ATTORNEY.

United States Patent Office

2,985,221  
Patented May 23, 1961

---

2,985,221

APPARATUS FOR FORMING AND HEAT SEALING TUBULAR EDGINGS TO THERMOPLASTIC SHEET MATERIAL

Sidney H. Magid, Morrisville, Pa.
(110 Elm St., Roslyn, E. Hills, N.Y.)

Filed June 24, 1957, Ser. No. 667,576

9 Claims. (Cl. 154—1.8)

This invention relates to apparatus for forming and assembling articles of manufacture requiring flexible annular edgings thereon and, more particularly, to a device for forming and applying flexible annular edgings on or to sheet thermoplastic material.

It has been found that thermoplastic materials, such as vinyl and other synthetic resin plastic sheeting, are particularly suited to mass production methods for manufacturing various types of articles requiring flexible annular edgings including bowl covers, pants for infants, dustproof enclosures, and the like. However, conventional apparatus for forming and applying annular flexible edgings on or to such material have proved to be costly, inadequate, and sometimes quite difficult. This is particularly the case when it is desired to form said flexible edging with a bight, with or without an elastic member or drawstring, or to apply said edging to the bounding wall of an opening defining portions of the sheet material, such as in baby pants and the like. It is, therefore, an object of the present invention to provide novel, high speed apparatus for forming and applying a flexible annular edging on or to flat articles, and on or to single or multiple ended tubular articles of manufacture, so as to provide predetermined reinforced tubular and annular edgings thereon, which edging may be provided with an internal elastic band.

Another object of the present invention is to provide apparatus for enclosing elastic bands, drawstrings, etc., within a bight portion simultaneously formed around the open end of thermoplastic pouches or bags having one open end and one closed end.

A further object of the present invention is to provide apparatus of the above type having a plurality of diverse forming and fabricating assemblies arranged in a predetermined manner for forming tubular edging on an article of manufacture.

One of the important features of the present invention is that an elastic band can be used to support the annular material upon the forming apparatus, following which a single action of the apparatus is operative to turn the material back upon itself so as to form a bight to envelope the elastic band between opposite sides thereof and after which a source of heat is used to seal together the contacting surfaces of the folded material. This provides a welded seam which may at the same time or at a later time be secured to associated thermoplastic material forming another part of the manufactured article. For example, the apparatus made in accordance with the present invention may be so arranged that the waist band of a pair of baby pants may be formed in the foregoing manner, and the leg openings may be finished without having to remove the article from the apparatus so that a substantially high rate of production can be realized.

All of the foregoing and still further objects and advantages of this invention will become apparent from a study of the following specification, taken in connection with the accompanying drawing, wherein:

Fig. 1 is a front elevational view, with parts broken away, of apparatus made in accordance with the present invention.

Fig. 2 is an enlarged fragmentary view of certain parts shown in Fig. 1, showing the manner in which a thermoplastic article of manufacture is formed.

Fig. 4 is an enlarged fragmentary view, similar to Fig. 2, showing in still greater detail the manner in which the tubular sections are formed.

Fig. 7 is an enlarged fragmentary top plan view of the apparatus shown in Figs. 5 and 6.

Fig. 8 is a view similar to Figs. 5 and 6, showing a modified form of construction and arrangement for performing a different function.

Figure 3:
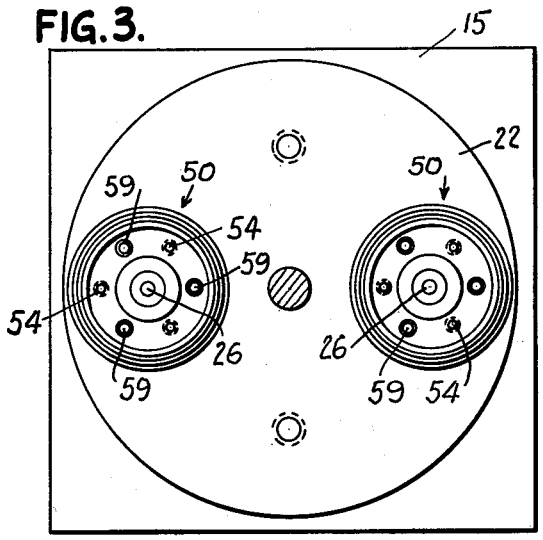
Fig. 3 is a top plan view, taken along line 3—3 of Fig. 1.

Referring now more in detail to the drawing, and more particularly to Figs. 1 to 4 thereof, apparatus made in accordance with the present invention is shown arranged for the sequential formation of tubular articles of manufacture having a plurality of formed openings therein, such as pants for infants. This apparatus includes a base 15 upon which a pair of upwardly extending columns 17 are secured, such as by screws 18. A stationary base member 22 having a downwardly extending peripheral flange 24 is secured to the top of the columns 17 by continuously threaded studs 27 which also support upwardly extending stems 26 for purposes hereinafter described. An associated member 30, substantially identical in shape and configuration to the stationary base member 22, is arranged for reciprocating vertical movement relative to the stationary base member 22 by means of a plunger 33. This plunger extends through an enlarged opening 35 in the fixed support 15 so as to be electrically and thermally insulated therefrom. The associated member 30 is also provided with enlarged openings 36 through which the support columns 17 extend. Bushings 37 of electrically insulated material are secured to the opening defining portion of the associated member 30, such as by screws 38 so as to slidably engage the support column 17 and also electrically insulate the associated member 30 from the support columns. A compression spring 40 surrounding each one of the support columns 17 normally urges the associated member 30 in a downward direction. A rigid stop 20, in the form of a circular ring, is secured to each of the support columns 17 adjacent to the lower ends thereof for limiting this downward movement of the associated member 30. An inert buffer strip 41 of dielectric material is secured by any suitable adhesive to the opposed flanges 24, 31 of the stationary base member 22 and associated member 30, respectively.

In the initial position shown in Fig. 1, the flexible inert buffer strip 41 is substantially coextensive with the outer peripheral surfaces of the opposed flanges, but is adapted to be folded inwardly in response to the relative movement of the stationary and associated member toward each other, such as in the position shown in Fig. 2. Thus, by placing a tubular section of thermoplastic material, such as a partially finished pair of baby pants 43, over the outside surface of the buffer strip 41 and applying an elastic band 44 to the central portion thereof, the elastic band 44 in response to upward movement of the plunger 33 and flange 31 of the associated member 30, is operative to draw the thermoplastic material 43 radially inwardly toward the folded center of the buffer strip 41a, as shown in Fig. 2 and Fig. 4. In this position, the partially relaxed band 44a has caused the thermoplastic material 43a to be folded back upon itself so as to define a hem. With the fixed support 15 and the support column 17, together with all of the parts electrically connected thereto connected to ground, and the plunger 33 and associated member 30 connected to the other side of a source of high frequency current, the movement of the parts to the position shown in Fig. 2 is operative to effect the flow of current through the folded thermoplastic tubular material 43a to effect the sealing or integral welding thereof, according to principles will known to those skilled in the art. The use of the aforementioned apparatus is operative to complete the waist of a pair of pants for an infant, as will be readily understood.

Figure 5:
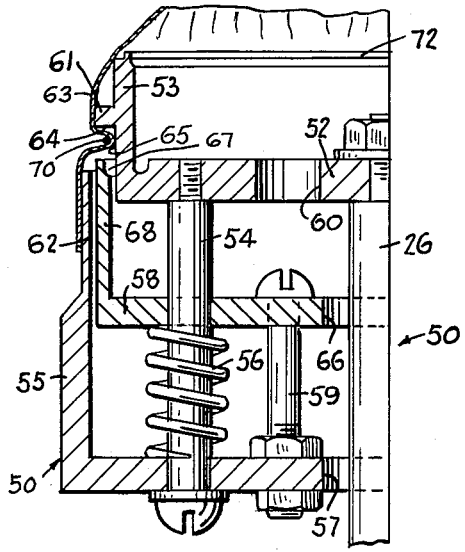
Fig. 5 is a fragmentary longitudinal cross-sectional view showing a first position of certain of the fabricating assemblies forming a part of the present invention.
Figure 6:
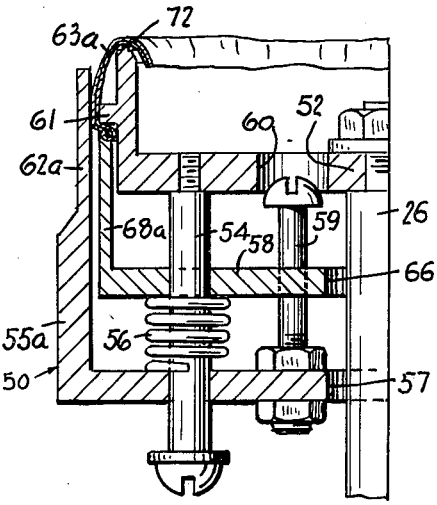
Fig. 6 is a view similar to Fig. 5, showing an advanced operating position.

An auxiliary fabricating assembly 50 is secured to the upper extremity of each of the stems 26, as more clearly shown in Figs. 1 and 3. With reference to Figs. 5 and 6, each such assembly 50 is shown to include a base member 52 that is rigidly secured to the upper extremity of the respective stem 26. This member includes an upwardly extending peripheral flange 53 and a plurality of downwardly extending bolts 54 upon which a second member is slidably supported for reciprocating vertical movement. This second member 55 is provided with an upwardly extending peripheral flange 62 and a plurality of upwardly extending rigid bolts 59 which cooperate with the depending bolts 54 of the base member 52 for guiding an intermediate central member 58 for reciprocating vertical movement relative to the base member 52 and second member 55. The intermediate member 58 is also provided with an upwardly extending peripheral flange 68 for purposes hereinafter described. The base member 52 is also provided with a plurality of openings 60 for accommodating the upper ends of the fixed bolts 59, as shown in Fig. 6, when the parts are moved toward each other. Compression springs 56 surrounding each of the depending bolts 54 resiliently support the intermediate member 58 in the normal central position shown in Fig. 5.

A radially outwardly extending rib 61 integral with the peripheral flange 53 of the base member 52 is disposed in the path of the vertical movement of the peripheral flange 68 of the intermediate member 58. However, the rib 61 is spaced inwardly from the path of movement of the flange 62 of the second member 55 a distance corresponding to approximately twice the thickness of the thermoplastic material being treated. The upper peripheral edge of the flange 68 of the intermediate member 58 is also provided with a groove 67 that cooperates with the shoulder 64 formed by the rib 61 to form a cavity for accommodating a fold of the tubular sheet material 63 and the associated elastic band 70, as will now be explained.

A tubular section of the thermoplastic material 63 is drawn over the top of the assembly 50, with the parts in the normal position shown in Fig. 5. An elastic band 70 is then placed over the thermoplastic tubular sheet 63, whereupon the sheet is drawn radially inwardly so as to provide an initial fold. By then raising the second member 55, the upper edge of the intermediate member's flange 68 is drawn in to abutting engagement with the material 63 and moves the material against the rib 61, thereby halting continued vertical movement of the intermediate member 58. However, the second member 55 is free to continue the vertical upward movement, so that it clears the rib 61 and draws the lower portion of the tubular sheet material 63 upwardly therebetween so as to impress the fold, as shown in Fig. 6. The folded over material of the flexible edging 63a is prevented from being displaced by the engagement of the upper peripheral edge of the raised intermediate flange 68a and the raised flange 62a of the raised second member 55a. The free ends of the tubular sheet material or leg are then folded radially inwardly over a finely machined ridge 72 integral with the upper edge of the flange 53 of the base member 52. This procedure and operation are repeated for the other similar fabricating assembly 50 forming a part of the present apparatus. If the flexible edging 63a is to be secured to another thermoplastic member, such as the leg-opening-defining portions of the baby pants, such portions are then placed over the inwardly folded free ends of the tubular sheet material. That is to say, the incomplete pants body 100 of thermoplastic material is placed over the assembly shown in Fig. 1, so that the waist portion 43 of the pants body is located around the flexible buffer strip 41 which bridges the space between flanges 31 and 24. Leg areas 99 are located over assemblies 50 so that they are in surface contact with the flexible edgings 63a. Following this initial arrangement, as previously described, the elastic band 44 is placed around the portion 43 intermediate the flanges 31 and 24. This elastic band 44 holds the pants in fixed position so that the leg areas 99 which are now tautly positioned, are maintained on assemblies 50 in proper location. Then platen 74 is lowered to approach the operating edge of 50 and associated member 30 is moved up to the member 22 so as to bring the working edges of flanges 31 and 24 together. This action causes 44—43 and 41 to move radially inwardly. The voltage source is actuated causing the confronting surfaces of thermoplastic material to heat seal together. This operation just completed forms the legs of the pants and the waist, thereby completing the assembly operation. The pants may then be removed from the apparatus for further finishing, following which another tubular thermoplastic member may be placed upon the apparatus for treatment in accordance with the foregoing methods.

It will be noted that by providing a tear edge by means of the ridge 72, each fabricating assembly 50 can only make an internal attached edging with all of the edges of the edging and associated article coincident. However, by eliminating the ridge 72, the same apparatus can be used to apply an internal flexible edging with non-coincident edges.

Referring now to Fig. 8 of the drawing, a fabricating device 77 quite similar to device 50 (Fig. 5) hereinbefore described, is shown in an inverted position. This apparatus is particularly suited for treating tubular articles that are closed at one end and open at the other end, in which it is desired to insert a rigid or flexible member into a seam formed at the open end, such as a bag or pouch. Structurally, this assembly 77 differs from the aforementioned assemblies 50 only by the use of an additional spring 79 disposed between the base member 52 and the intermediate member 58. Since the stem 26 rigidly supports the base member 52, the intermediate member 58 is resiliently supported upon the additional spring 79 surrounding each bolt 54, the second member 55 being resiliently supported upon the compression spring 56 through the intermediate member 58. By then placing the open end of the bag 82 over the top of the assembly after the hoop or flexible member 83, has been positioned, a downward pressure may be exerted against the base member 52 to effect the sealing of the seam in the aforementioned manner. In this assembly, the additional springs 79 should be of lighter construction than the other compression springs 56 so that upon downward pressure against the second member 55 the intermediate member 58 will be moved down into holding engagement with the article being fabricated prior to the movement of the peripheral flange 62 of the second member 55 past the rib 61, as hereinbefore described, to impress the fold.

Figures 9, 10:
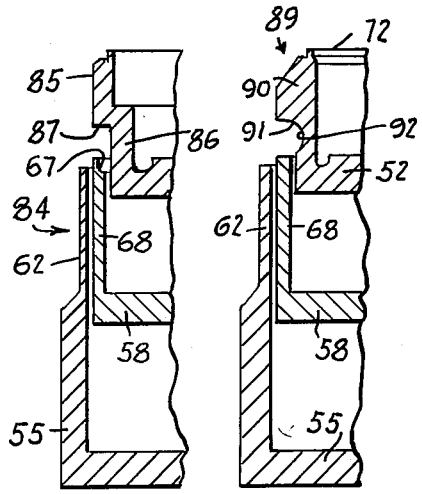
Fig. 9 is a fragmentary longitudinal cross-sectional view showing certain modifications of certain parts of the apparatus shown in Figs. 5 and 6.
Fig. 10 is a view similar to Fig. 9, showing a still further modified form of construction.

Referring now to Fig. 9, a modified form of construction 84 is shown wherein the shoulder 87 of the base member 52 is formed by an inwardly offset radial flange 86 in cooperation with the main peripheral flange 85 thereof.

In Fig. 10, a further modified form of construction 89 is shown wherein this shoulder 91 is formed by means of a circumferential recess 92 disposed beneath the main flange 90. In any event, it is only necessary to provide sufficient space between the circumferential recess 67 in the upper edge of the intermediate flange 68 so as to accommodate the double thickness of the thermoplastic material together with the inserted resilient band or hoop.

Applicant has described the present invention in connection with the manufacture of a pair of pants for an infant. In accordance with this construction, a device has been provided in which such pants can virtually be constructed at a single station without having to move the pants between a large series of associated devices. This, of course, makes for more simplified construction methods and reduces labor cost. It will thus be recognized that this apparatus may be readily adapted for use in connection with similar articles of manufacture without materially departing from the basic teachings of this invention.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent is:

1. Apparatus for forming and heat-sealing a flexible edging on tubular articles comprising, in combination, a base, a base member, upwardly extending rod means for supporting said base member a fixed distance above said base, an associated member having a circumference of substantially identical size and shape as said base member, said associated member being in juxtaposition with said first member and being guided for axial movement relative thereto, said base member and associated member being in normally spaced apart relationship, means for effecting said relative axial movement of said members toward and from each other, and an inert flexible buffer strip extending around and secured to the adjacent outer peripheral surfaces of said base member and associated member to bridge the gap therebetween, said strip when said members are in said normally spaced apart relationship being substantially coextensive with said outer peripheral surfaces, and said strip, when said members move axially toward each other, being collapsible radially inwardly between said members and serving as a buffer for heat sealing a thermoplastic workpiece placed around said apparatus.

2. Apparatus as set forth in claim 1, further comprising heat producing means for generating a welding heat between said base and associated members, said heat producing means comprising a source of high frequency current, and said base member and associated member being at least electrically insulated from each other, said base member and associated member being connected across said source.

3. Apparatus for manufacturing tubular articles having a plurality of wall openings comprising, in combinations, a first fabrication assembly having a main support member, a first base member, upwardly extending rod means for supporting said first base member a fixed distance above said support, a second member having a circumference of substantially identical size and shape as said first member, said second member being in juxtaposition with said first member and being supported for axial movement relative thereto, said first and second members being in normally spaced apart relationship, means for selectively effecting said axial movement of said second member relative to said first member, a flexible strip extending around and secured to the adjacent outer peripheral surfaces of said first and second members to bridge the gap therebetween, said strip when said members are in said normally spaced apart relationship being substantially coextensive with said peripheral surfaces, said strip, when the first and second members move toward each other, being collapsible radially inwardly between a constricting member, said band being receivable within the borders of one of a plurality of wall openings of an article being worked upon for folding back upon itself the peripheral portions of said one wall opening to define a tubular portion therewith, heat producing means associated with said first and second members for heat sealing said folded peripheral portions of the article together, and at least one auxiliary fabrication assembly carried by said support member in spaced relationship with said first fabrication assembly for simultaneously treating the peripheral opening-defining portion of another wall opening of said plurality of wall openings.

4. Apparatus for forming and assembling tubular articles comprising, in combination, a base member having a base peripheral flange, the upper extremity of said base flange having means for sealing a plurality of thermoplastic members together, a second member having a peripheral flange of larger diameter than said base flange supported for axial movement relative to said base member, and an intermediate member disposed between said base member and second member supported for axial movement relative thereto, said intermediate member being arranged for enclosing engagement with said base member to hold a workpiece on said base member, and said second member being arranged for axial movement relative to said base member and said intermediate member cooperating with the workpiece on said base member to fold the workpiece upon itself, and means to move the second member and the intermediate member axially of said base member.

5. Apparatus as set forth in claim 4, wherein said second member is suspended from said base member, said intermediate member being disposed within said second member, and spring means resiliently supporting said intermediate member upon said second member.

6. Apparatus as set forth in claim 5, further comprising a radially outwardly directed rib on said base member normally spaced from and disposed in the path of movement of said intermediate member and being spaced radially inwardly from the path of movement of said flange of said second member, whereby in response to upward movement of said second member, said peripheral flange of said intermediate member is brought into abutment with said rib to clamp a work piece therebetween, and in response to continued upward movement, said peripheral flange of said second member is adapted to receive said rib therewithin.

7. Apparatus as set forth in claim 4, wherein said second member is supported above said base member, said intermediate member being disposed within said second member, spring means resiliently supporting said intermediate member in normally spaced relationship above said base member, and additional spring means resiliently supporting said second member in normally spaced relationship above said intermediate member.

8. Apparatus as set forth in claim 7, further comprising a radially outwardly directed rib on said base member normally spaced from and disposed in the path of movement of said intermediate member and being spaced radially inwardly from the path of movement of said flange of said second member, whereby in response to downward movement of said second member, said peripheral flange of said intermediate member is brought into abutment with said rib, and in response to continued downward movement of said second member, said peripheral flange of said second member receives said rib thereagainst.

9. Apparatus for forming and heat sealing a flexible edging on tubular articles comprising in combination a base having upwardly extending rod means attached thereto, a base member and an associated member, both said members being supported on said base in juxtaposition with each other and having a periphery of substantially identical size and shape, one of said members being guided by said rod means for axial movement relative to the other of said members, said base member and associated member being in normally spaced apart relationship, means for effecting said axial movement of one of said members toward and from the other, and an inert flexible buffer strip extending around and secured to the adjacent outer peripheral surfaces of said base member and associated member to bridge the gap therebetween, said strip, when said members are in said normally spaced apart relationship, being substantially coextensive with said outer peripheral surface, and said strip, when said members move axially toward each other, being collapsible radially inwardly between said members and serving as a buffer for heat sealing a thermoplastic workpiece placed around said apparatus.

References Cited in the file of this patent

UNITED STATES PATENTS

| | | |
|---|---|---|
| 2,466,643 | Magid | Apr. 5, 1949 |
| 2,484,340 | Gardner | Oct. 11, 1949 |
| 2,500,895 | Davies | Mar. 14, 1950 |
| 2,580,075 | Clark et al. | Dec. 25, 1951 |
| 2,646,105 | Langer | July 21, 1953 |
| 2,712,846 | Del Savio et al. | July 12, 1955 |
| 2,733,752 | Bihler et al. | Feb. 7, 1956 |
| 2,768,107 | Magid | Oct. 23, 1956 |